April 20, 1948. C. A. GUNN 2,439,973
DOBBY KNIFE CONNECTOR
Filed Nov. 15, 1946 2 Sheets-Sheet 2
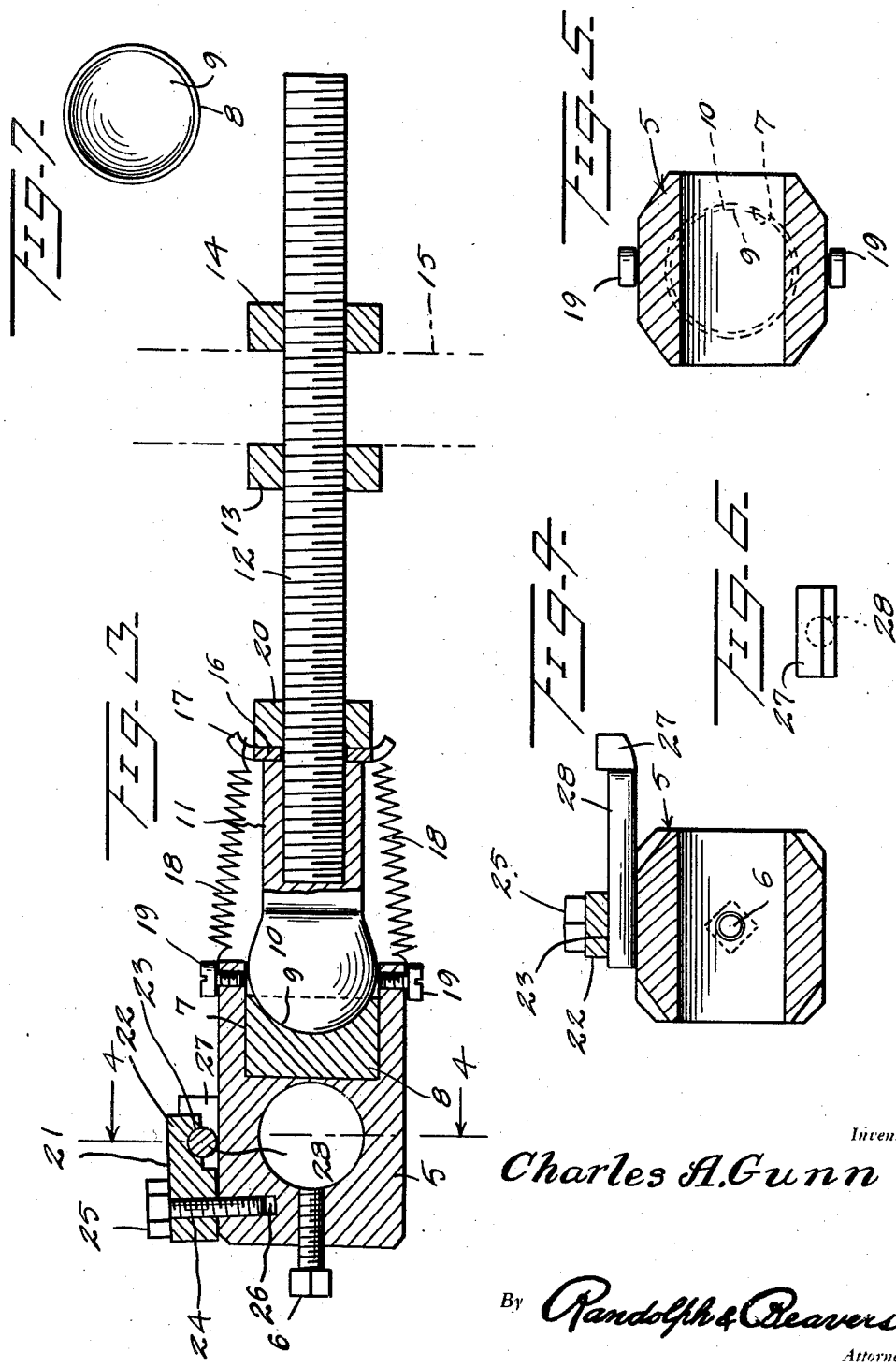
Inventor
Charles A. Gunn
By Randolph & Beavers
Attorney Patented Apr. 20, 1948

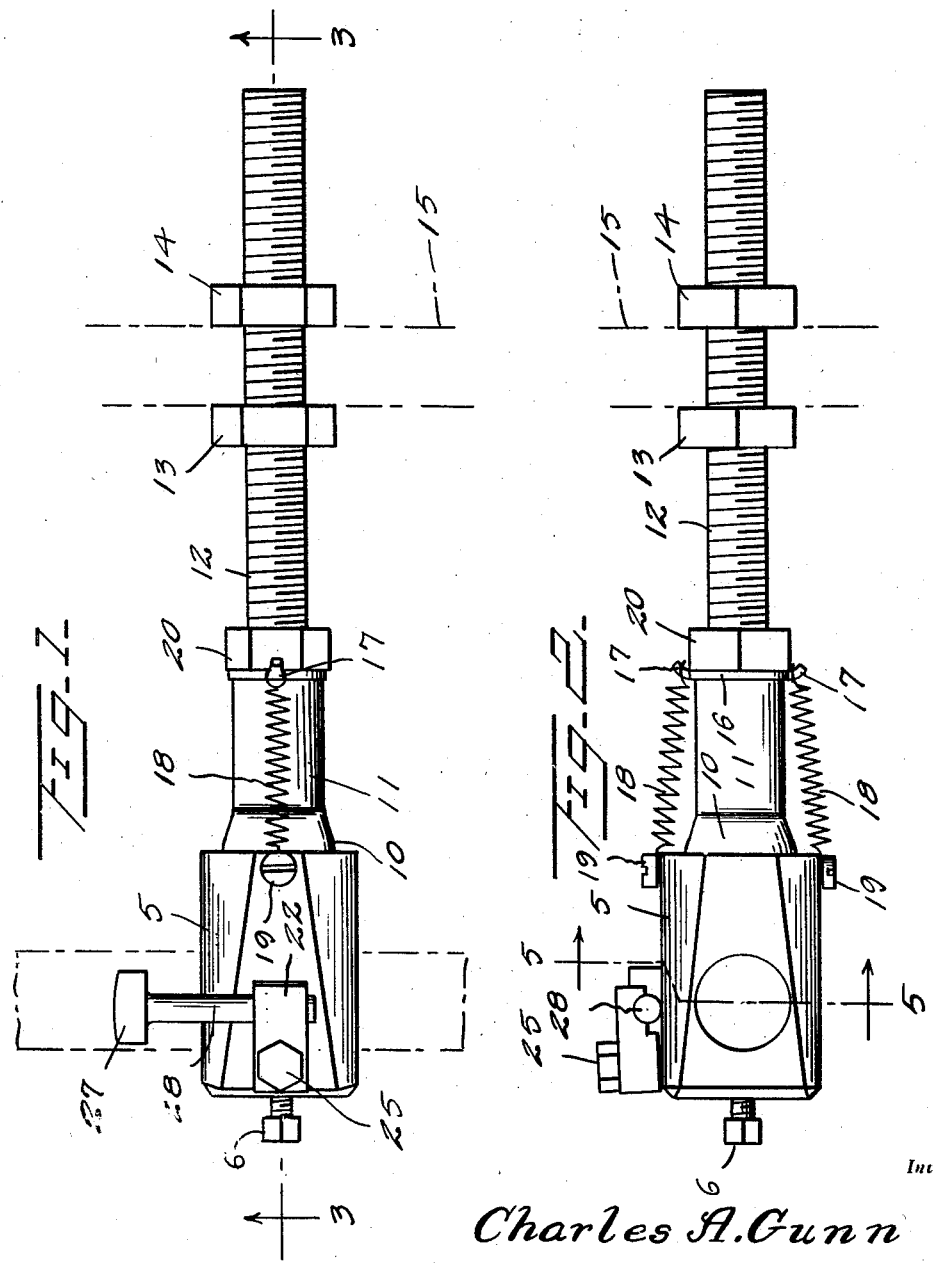

2,439,973

UNITED STATES PATENT OFFICE 2,439,973

DOBBY KNIFE CONNECTOR

Charles A. Gunn, Alexander City, Ala.

Application November 15, 1946, Serial No. 709,921

1 Claim. (Cl. 139—66)

This invention relates to improvements in dobby head looms and more particularly to a connection between the usual dobby rocker arm and the dobby knife.

The principal object of the present invention is to provide such a connection that will permit a smoother motion of the dobby knife and to the end that the jack hooks will more efficiently be maintained on the knife.

Another object of the invention is to provide a connection of this character which can be installed on looms without materially altering the conventional mechanical elements and arrangement and which can be so installed at a nominal cost.

A further object of the invention is to provide such a connection which in use will be far more effective and positive acting and which due to a special lubricating feature, will not require lubricating periodically.

These and various other objects and advantages of the invention will become apparent to the reader of the following description.

In the drawings:

Figure 1 is a top plan view of the assembly.

Figure 2 is a side elevational view of the structure shown in Figure 1.

Figure 3 is a longitudinal sectional view taken on line 3—3 of Figure 1.

Figure 4 is a transverse section taken on line 4—4 of Figure 3.

Figure 5 is a cross section taken on line 5—5 of Figure 2.

Figure 6 is an end elevational view of the clamp element.

Figure 7 is an elevational view showing the concave side of the wood end bearing.

Referring to the drawings, numeral 5 denotes a block through which the dobby knife extends, the knife and block being held together by a set screw 6.

One end of the block 5 has a socket 7 therein for receiving a wooden bearing block 8 having a concave face 9 into which works a ball head 10, the bearing block 8 being impregnated with a suitable oil, so that this bearing will serve indefinitely without further lubrication.

The ball head 10 has a tubular internally threaded extension 11 which receives one end of an elongated threaded rod 12, which has jamb nuts 13, 14 thereon for clamped engagement with the structure 15.

A washer or disk 16 has radially disposed lugs 17 from which tension springs 18 extend and are secured to the adjacent end of the block 5 by set screws 19, there being a jamb nut 20 feedable on the threaded rod 12 to clamp the washer or disk 16 against the adjacent end of the tubular extension 11.

The washer 16, springs 18 and set screws 19 serve to hold the ball head 10 snugly against the bearing block 8.

A guide consists of a clamp block 21 having a reduced extension 22, grooved as at 23 on its lower side and formed with an opening 24 therethrough to receive a machine screw 25, which is adapted to be driven into a threaded recess 26 in the block 5.

A guide member consisting of a rectangular shaped block 27 and a pintle 28 is used for keeping the knife in line in its working operation, this pintle 28 being disposed across the block 5 and partly projecting into the groove 23 of the extension 22 and held snugly against the block 5 when the machine screw 25 is driven downwardly to tighten the block 21 against the block 5.

It can therefore be seen, that the oil impregnated wooden bearing can be inserted and may be wholly replaced at long intervals, thus making it unnecessary that the joint be frequently attended to insofar as lubrication is concerned. Further, this will conserve oil and eliminate the disadvantage of freshly oiled connections allowing for oil to drop on the work.

Further, as the connection operates and the wooden bearing wears, the springs 18 will take up any occurrence of slack or lost motion. This facility will eliminate wear on the knife.

Obviously, when the bearing wears beyond further use, it can be quickly replaced by removing the springs from the lugs 17 and disconnecting the ball head 10, followed by extraction of the wooden bearing 8.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A dobby knife connector comprising a block having a shaft opening therethrough and formed with a socket at one end, a bearing block disposed in the socket, an elongated threaded rod, a ball head disposed into the socket and against the bearing block, said ball head being provided with a tubular internally threaded extension for receiving one end of the threaded rod, a jamb nut on the threaded rod, a washer on the rod held against the outer end of the threaded extension by said jamb nut, said washer being provided with outstanding lugs and tension springs interposed between the block at the socket end thereof and connected to said lugs for holding the ball head disposed into the socket and snugly against said bearing block.

CHARLES A. GUNN.

REFERENCES CITED

The following references are of record in the file of this patent:

UNITED STATES PATENTS

| Number | Name | Date |
|---|---|---|
| 1,425,730 | Whitted | Aug. 15, 1922 |
| 1,733,457 | Hannahs | Oct. 29, 1929 |

FOREIGN PATENTS

| Number | Country | Date |
|---|---|---|
| 311,679 | Great Britain | May 14, 1929 |